D. D. WILLIAMS.
MOWER.
APPLICATION FILED MAY 15, 1918.
1,300,907.
Patented Apr. 15, 1919.
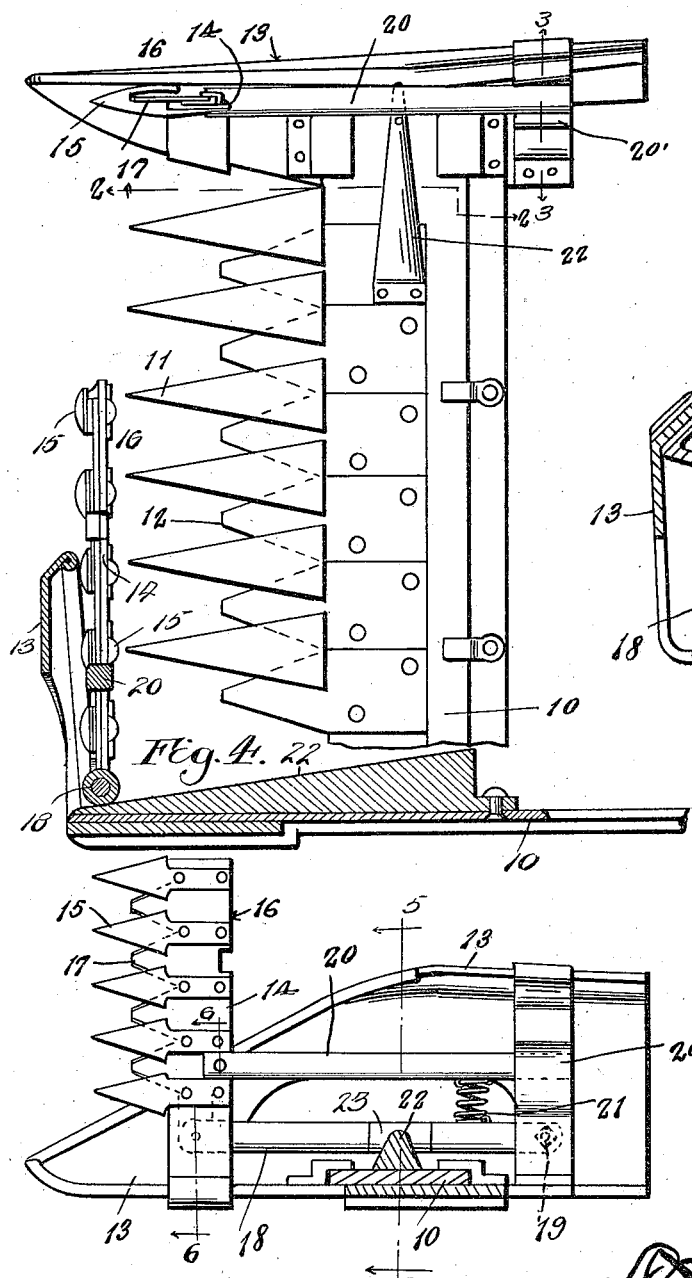
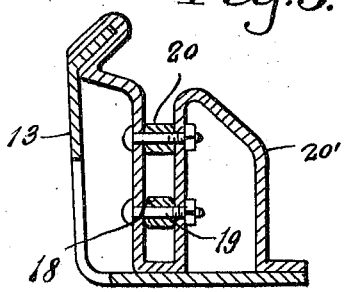
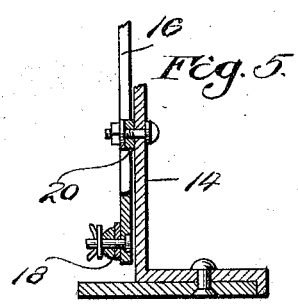
Inventor
D. D. Williams
By
Attorney

UNITED STATES PATENT OFFICE.

DELVIN D. WILLIAMS, OF GREENWOOD, WISCONSIN.

MOWER.

1,300,907.   Specification of Letters Patent.   Patented Apr. 15, 1919.

Application filed May 15, 1918. Serial No. 234,698.

*To all whom it may concern:*

Be it known that I, DELVIN D. WILLIAMS, a citizen of the United States, residing at Greenwood, in the county of Clark and State of Wisconsin, have invented certain new and useful Improvements in Mowers; and I do hereby declare the following to be a full, clear, and exact description of the invention, such as will enable others skilled in the art to which it appertains to make and use the same.

The object of the invention is to provide a dividing cutter for mowers for use in harvesting grain, clover and the like, which will serve to definitely and effectively separate the swath of the cutter bar from the standing grain or clover or the uncut portion thereof, especially when there is entanglement of the growing crops, due to windfalls and the like, so that a distinct line of demarcation is afforded for the guidance of the operator of the mowing machine, to avoid the possibility of going over the same ground twice or of leaving uncut portions of the crop.

Further objects and advantages will be brought out in the course of the following description, it being understood that changes in form and proportion may be resorted to within the scope of the claims without departing from the spirit of the invention.

In the drawings:

Figure 1 is a plan view of a portion of a mower cutter bar having a dividing or upright cutter embodying the invention applied in the operative position thereto.

Fig. 2 is a transverse sectional view taken on a plane indicated by the line 2—2 of Fig. 1.

Fig. 3 is a sectional view taken on the plane 3—3 of Fig. 1 to show the bracket, used in connection with the mower shoe to support certain elements of the divider.

Fig. 4 is a sectional view on the plane indicated by the line 5—5 of Fig. 2.

Fig. 5 is a detail sectional view on the plane indicated by the line 6—6 of Fig. 2.

In the illustrated embodiment of the invention, the usual cutter bar of a mowing machine is indicated at 10, having the fingers 11 and the knives or blades 12 for reciprocatory movement relative to the guard fingers, while at the end of the cutter bar is the usual shoe 13 by which the path of the cutter bar is separated from the uncut portion of the field.

Mounted in a suitable guide 14, carrying fingers 15, is a vertically reciprocable cutter bar 16 having the knives 17, and connected with this cutter bar is a rocker 18 consisting of a bar fulcrumed as at 19 upon a bracket 20' carried by the shoe 13, said bracket being indicated in detail in Fig. 3. A brace 20" also extends between said bracket and the guide 14, to mutually strengthen or stiffen the parts, while an actuating spring 21 is shown interposed between the brace 20 and said rocker bar to yieldingly hold the latter depressed and return it to its normal position after it has been elevated to correspondingly actuate the auxiliary cutter bar 16. The movement of said auxiliary cutter bar, contrary to the tendency of the return spring 21, is secured in the construction illustrated by a reciprocatory cam 22 carried by and firmly attached to the main cutter bar and of tapered form to pass under the rocker 18, as will be apparent by reference to Fig. 4 of the drawings.

As the terminal shoe of the main cutter bar traverses the ground, it will serve to raise the fallen grain or clover and any entangled portions thereof as in the ordinary practice, and this will bring said grain or clover into the zone of operation of the vertical cutter mechanism, so that the material will be cut along a vertical line or in a vertical plane represented by the path of the shoe, and hence in the course of the progress of the mowing machine, the path traversed thereby or the swath cut thereby will be clearly defined for the guidance of the operator of the machine in making the next traverse of the field, to avoid going over the same ground twice in order to cut and harvest all of the material, and also to avoid leaving uncut such portions of the crop as ordinarily would not be reached by the main cutter mechanism and hence would be left in a more or less flat condition upon the field. In order to minimize the friction and hence the power necessary to operate the additional or supplemental cutter mechanism, the rocker bar 18 may be provided with an anti-friction sleeve or roller 23 for contact with the cam carried by the main cutter bar, but owing to the elimination of back draft or resistance due to the entangled grain or clover at the outer end of the main cutter bar, the side draft upon the machine is materially lessened or entirely eliminated, and consequently there is less strain upon the machine and less effort on the part of the team or engine is required in order to accomplish the desired results.

From the foregoing description it will be seen that the attachment of the supplemental cutting means to an ordinary mower mechanism may be accomplished without materially modifying the latter further than necessary to provide for the engagement of bolts or fastening devices for the elements of the attachment, the cam being secured, as indicated in Fig. 1, to the upper or exposed side of the cutter bar to project toward the terminal shoe of the main cutter mechanism, and the guide for the auxiliary cutter bar and the bracket, shown in Fig. 3, being readily attachable to said shoe without in any way affecting the normal operations or functions of the main or usual cutter mechanism. Obviously, the auxiliary cutter bar should be arranged to operate as near the vertical plane of the exterior surface of the shoe of the main cutter mechanism as possible, but within the plane thereof sufficiently to insure a well defined division between the cut and uncut portions of the field so that the necessity of a helper for the driver or operator of the mowing machine, in order to clear the way for the machine and indicate the path which the same should follow on the succeeding trip or traverse of the field, may be avoided.

It will also be obvious that the attachment may be constructed at a small cost relative to the main mower machanism, and being made independently thereof, may be applied to any ordinary mowing machine without the exercise of skilled labor.

Having described the invention, I claim:

1. In a machine of the class described, the combination with a main cutter bar and terminal shoe, of an upright supplemental cutter bar, a bracket carried by said shoe, a rocker bar fulcrumed upon the said bracket and having connection with the supplemental cutter bar, a spring for moving the rocker bar in one direction, and a cam bar carried by the main cutter bar for engagement with the rocker to move the latter in opposition to the tendency of said spring.

2. In a machine of the class described the combination with main cutter mechanism including a reciprocatory cutter bar and a terminal dividing shoe, of a supplemental cutter mechanism including an upright guide supported by said shoe, a reciprocatory supplemental cutter bar mounted in said guide, a bracket secured to the shoe in rear of the supplemental cutter bar, bracing connections between said bracket and guide, a rocker bar fulcrumed upon the bracket and having connection with the supplemental cutter bar, a spring for moving the rocker bar in one direction, and a cam carried by the main cutter bar for moving the rocker bar in opposition to the tendency of said spring.

3. An attachment for the cutting mechanism of machines of the class described, consisting of supplemental cutter mechanism including a guide and a reciprocatory cutter bar, the former being adapted for attachment to the terminal dividing shoe of the main cutter mechanism, a bracket also adapted for attachment to said shoe, a brace bar connecting the bracket with the guide of the supplemental cutter mechanism, a rocker bar fulcrumed upon the bracket and having pivotal connection with the auxiliary cutter bar, a spring interposed between said brace bar and rocker bar for yieldingly holding the latter in one position, and a tapered cam bar for attachment to the cutter bar of the main cutter mechanism for engagement with said rocker bar for movement thereof and the attached supplemental cutter bar in opposition to the tendency of said spring.

In testimony whereof I affix my signature in presence of two witnesses.

DELVIN D. WILLIAMS.

Witnesses:
I. S. ARMSTRONG,
R. E. McINTYRE.

Copies of this patent may be obtained for five cents each, by addressing the "Commissioner of Patents, Washington, D. C."